United States Patent
Hasel et al.

(10) Patent No.: US 9,376,827 B2
(45) Date of Patent: Jun. 28, 2016

(54) PRODUCTION METHOD FOR A MAST ARM AND CONCRETE-DISTRIBUTING MAST

(71) Applicant: Putzmeister Engineering GmbH, Aichtal (DE)

(72) Inventors: Peter Hasel, Stuttgart (DE); Eric Bass, Hasselroth-Neuenhasslau (DE); Roman Riebenstahl, Gelnhausen (DE); Jochen Ruppel, Bad Soden-Salmuenster Kerbersdorf (DE); Karl Westermann, Walddorfhaeslach (DE)

(73) Assignee: Putzmeister Engineering GmbH, Aichtal (DE)

( * ) Notice: Subject to any disclaimer, the term of this patent is extended or adjusted under 35 U.S.C. 154(b) by 29 days.

(21) Appl. No.: 14/385,883

(22) PCT Filed: Mar. 19, 2013

(86) PCT No.: PCT/EP2013/055744
§ 371 (c)(1),
(2) Date: Sep. 17, 2014

(87) PCT Pub. No.: WO2013/152932
PCT Pub. Date: Oct. 17, 2013

(65) Prior Publication Data
US 2015/0107692 A1    Apr. 23, 2015

(30) Foreign Application Priority Data

Apr. 13, 2012  (DE) .......................... 10 2012 206 093
May 7, 2012   (DE) .......................... 10 2012 207 568

(51) Int. Cl.
*E04G 21/04*    (2006.01)
*F16L 3/127*    (2006.01)

(52) U.S. Cl.
CPC ........ *E04G 21/0445* (2013.01); *E04G 21/0436* (2013.01); *F16L 3/127* (2013.01);
(Continued)

(58) Field of Classification Search
CPC .. E04G 21/0445; E04G 21/0436; F16L 3/127
USPC .......................................................... 137/615
See application file for complete search history.

(56) References Cited

U.S. PATENT DOCUMENTS 5,640,996 A * 6/1997 Schlecht ................ B66C 13/40
                                                       137/615
6,808,025 B2   10/2004 Bissen et al.
(Continued)

FOREIGN PATENT DOCUMENTS

DE          30 13 450 A1    10/1981
DE          196 44 410 A1    4/1998

OTHER PUBLICATIONS

International Search Report of PCT/EP2013/055744, mailed Jun. 21, 2013.
(Continued)

*Primary Examiner* — Kevin Lee
(74) *Attorney, Agent, or Firm* — Collard & Roe, P.C.

(57) ABSTRACT

A method produces a mast arm with a mast arm body and with at least one pipe holder for a concrete-distributing mast for use on stationary and mobile concrete pumps with a plurality of mast arms which are connected to one another so as to be pivotable on articulated joints about an axis of articulation and which hold a concrete-conveying line which has at least one rotary joint which has an axis of rotation aligned with an axis of articulation of an articulated joint. The at least one pipe holder here has a pipe support section which serves for receiving the concrete-conveying line at a holding point which has a location predetermined by the position of the axis of articulation. The mast arm body is premanufactured with a receiving intersection and the at least one pipe holder is premanufactured with a fastening section which has a connecting intersection.

14 Claims, 4 Drawing Sheets

(52) U.S. Cl.
CPC ...... *Y10T29/49826* (2015.01); *Y10T 29/49947* (2015.01); *Y10T 29/49963* (2015.01); *Y10T 137/6881* (2015.04)

(56) References Cited

U.S. PATENT DOCUMENTS 7,654,286 B2 * 2/2010 Fuegel .................... E04G 21/04
　　　　　　　　　　　　　　　　　　　　　　137/615

2015/0204089 A1 * 7/2015 Ruppel et al. ....... E04G 21/0436
　　　　　　　　　　　　　　　　　　　　　　248/558

OTHER PUBLICATIONS

German Search Report in DE 10 2012 207 568.2, dated Feb. 19, 2013 with English translation of relevant parts.

* cited by examiner (A-A)

(A-A)

PRODUCTION METHOD FOR A MAST ARM AND CONCRETE-DISTRIBUTING MAST

CROSS REFERENCE TO RELATED APPLICATIONS

This application is the National Stage of PCT/EP2013/055744 filed on Mar. 19, 2013, which claims priority under 35 U.S.C. §119 of German Application Nos. 10 2012 206 093.6 filed on Apr. 13, 2012, and 10 2012 207 568.2 filed on May 7, 2012, the disclosures of which are incorporated by reference. The international application under PCT article 21(2) was not published in English.

BACKGROUND OF THE INVENTION

1. Field of the Invention

The invention relates to a method for producing a boom arm having a boom-arm body and having at least one pipe holder for a concrete-distributing boom and to a concrete-distributing boom for stationary and mobile concrete pumps having a plurality of boom arms which are connected to one another such that they can be pivoted about an axis of articulation at folding articulations and retain a concrete-delivery line, which has at least one rotary articulation and which has an axis of rotation aligned with an axis of articulation of a folding articulation, wherein the at least one pipe holder has a pipe-carrier portion for accommodating the concrete-delivery line at a retaining location, of which the siting is predetermined by the position of the axis of articulation.

2. Description of the Related Art

A concrete-distributing boom of the type mentioned in the introduction is known from DE 196 44 410 A1. The concrete-distributing boom described therein contains a concrete-delivery line and has three boom arms which are connected via folding articulations and can be adjusted by a hydraulic transmission. The concrete-delivery line in the concrete-distributing boom is made up of a multiplicity of pipe segments, which are retained on the boom arms by pipe holders.

Concrete-distributing booms frequently have not just three, but four, five or even more boom arms. The length of the individual boom arms is usually between 6 m and 8 m. In order that a concrete-distributing boom can be extended an overall length of up to 60 m or more, the boom arms in a concrete-distributing boom have to meet very high stability-related requirements. The required stability can be achieved by boom-arm bodies which comprise welded structures with a box profile joined together from four steel sheets. The large dimensions of the steel sheets and the introduction of heat during thermal joining result in said boom-arm bodies having very large production tolerances. These production tolerances are considerably larger than those which are necessary to meet the accuracy-related requirements for arranging the articulations and for positioning the hydraulic transmissions for moving the boom arms in a concrete-distributing boom.

During the production of concrete-distributing booms, it is therefore necessary for the welded structures of the boom-arm bodies to be subjected to high-outlay mechanical follow-up machining. Such mechanical follow-up machining holds the risk of the material being weakened in specific portions of a boom-arm body. In order for the required stability not to be adversely affected, the mechanical follow-up machining for welded structures of boom-arm bodies is reduced to a minimum.

In order that the boom-arm bodies in a concrete-distributing boom are not subjected to unnecessary loading, it is important for the axes of rotation of the rotary articulations of the delivery line and the axes of articulation of the folding articulations in the concrete-distributing boom to correspond very precisely. This makes it necessary to compensate for production tolerances.

In order to compensate for production tolerances, the pipe holders for accommodating the concrete-delivery line are usually adapted individually to the boom-arm bodies in a concrete-distributing boom and then welded on. The weld connections here are produced by hand, the concrete-delivery line in the first instance being preassembled on a boom-arm body and a pipe holder, usually comprising a plurality of parts, then being roughly fixed, set in position and welded. These operating steps cannot be automated with justifiable outlay and therefore have to be carried out manually. The operating steps also require an installer to establish weld connections in awkward positions, which makes it very difficult, and involves high outlay, to maintain a required weld-seam quality. The individual adaptations which are necessary for the pipe holders therefore means that it is not just the installation of pipe holders on a boom arm which involves high outlay and is very expensive; this is also the case for exchanging pipe holders on a boom arm in the context of maintenance work.

SUMMARY OF THE INVENTION

It is therefore an object of the invention to specify a method which can reduce the production outlay for a concrete-distributing boom and to create a concrete-distributing boom for which pipe holders can be installed and exchanged with low outlay.

This object is achieved by a method of the type mentioned in the introduction in the case of which the boom-arm body is prefabricated with an accommodating interface and the at least one pipe holder is prefabricated with a fastening portion. The fastening portion has a connection interface. The accommodating interface is produced with at least three plane-defining positional reference points, which are independent of production tolerances of the boom-arm body and are predetermined by the position of the axis of articulation such that, and the connection interface is designed with at least three plane-defining positional reference points, which predetermine the position of the pipe-carrier portion such that, the concrete-delivery line, by virtue of the pipe holder having its connection interface connected to the accommodating interface of the boom-arm body, can be accommodated by the pipe-carrier portion such that the retaining location has its siting predetermined by the position of the axis of articulation.

A concrete-distributing boom according to the invention has at least one boom arm with an accommodating interface and contains at least one prefabricated pipe holder with a fastening portion, which has a connection interface which is connected in a preferably releasable manner to the accommodating interface. The accommodating interface here has at least three plane-defining positional reference points, which are independent of production tolerances of the at least one boom arm and are predetermined by the position of the axes of articulation of the two adjacent folding articulations. The connection interface has at least three plane-defining positional reference points, which predetermine the position of the retaining location, of which the siting is defined by the accommodating interface being connected to the connection interface.

The solution according to the invention proceeds from the idea that it is possible ideally to define the concrete-delivery line in a concrete-distributing boom, between two rotary articulations, in the form of a polygonal progression comprising series of lines which are connected to one another by junction points. The series of lines here correspond to the delivery pipes. The junction points have the function of retaining locations for the pipe segments.

A concrete-delivery line in a concrete-distributing boom has axes of rotation which coincide with the axes of articulation of the folding articulations of the concrete-distributing boom. The invention is based on the finding that, if a concrete-delivery line runs essentially rectilinearly at the retaining locations between two axes of rotation, it is possible to avoid excessive loading of the pipe holders, increased wear to the delivery pipes or undesired boom movements during pumping operation.

The invention proposes, for this purpose, that the pipe holders should be designed with a pipe-carrier portion for accommodating the concrete-delivery line at a retaining location and with a connection interface for connection to the bodies of the boom arms, wherein an accommodating interface for the pipe holders is provided on the boom-arm bodies. The accommodating interface of the boom-arm bodies here is configured with positional reference points, the position of which is predetermined, independently of the production tolerances for the boom-arm body, solely by the position of the axes of articulation of the folding articulations on the boom arms and/or the axes of rotation of the rotary articulations of the concrete-delivery line. The connection interface of the pipe holders has positional reference points relating to a retaining location of a concrete-delivery line in the pipe-carrier portion of the pipe holder. These positional reference points are selected such that the concrete-delivery line in the concrete-distributing boom, by virtue of the pipe holder being connected to the boom-arm body, can be accommodated by the pipe-carrier portion at a retaining location, of which the siting is predetermined solely by the position of a specific axis of articulation of the boom arm and/or of a specific axis of rotation of the concrete-delivery line and is independent of the production tolerances of a boom-arm body.

As a result, pipe holders and boom-arm bodies can be produced independently of one another and it is then possible, without any high-outlay follow-up machining, to join the subassemblies together such that the retaining locations for the pipe segments correspond to the junction points of a polygonal progression which provides an ideal path for the concrete-delivery line, wherein the axes of articulation of the rotary articulations of the concrete-delivery line are positioned in the axes of rotation of the folding articulations of the boom arms.

It is advantageous if the boom-arm body is configured, at least in part, in the form of a hollow-profile body which has a portion with a wall reinforced by a material reserve, and the accommodating interface is formed in the reinforced wall of the boom-arm body. This measure makes it possible to compensate for the production tolerances of a welded structure without the strength of the concrete-distributing boom being adversely affected.

Forming the connection interface on the boom-arm body on a connection portion of a preferably plate-like adapter piece likewise makes it possible to compensate for the production tolerances of a welded structure without the strength of the concrete-distributing boom being reduced in the process. For compensating for production tolerances, the adapter piece has a material reserve. The connection piece may be, for example, of plate-like configuration and have an elevation serving as connection portion. The fastening portion of the pipe holder is also advantageously designed in the form of a plate-like connection piece which has a material reserve.

The boom-arm body may be produced with a plurality of accommodating interfaces for the connection of a pipe holder, each having at least three plane-defining positional reference points, which are independent of production tolerances of the boom-arm body and are predetermined by the position of the axis of articulation of a folding articulation.

An accommodating interface on a boom-arm body is advantageously produced in a device which is designed preferably in the form of a machining center and is intended for machining workpieces with dimensioning related to the position of the axes of articulation. It is also the case that the connection interface of a pipe holder is advantageously produced in a device which is designed preferably in the form of a machining center and is intended for machining workpieces with dimensioning related to the position of the concrete-delivery line accommodated by the pipe holder.

A pipe holder may be fastened on the boom-arm body using a releasable fastening means, in particular using screws. This measure makes it possible, within the context of maintenance work, for defective pipe holders to be exchanged, and replaced by appropriate new pipe holders, with low outlay. It is also possible, in principle, however for pipe holders to be fastened on a boom arm using bolts or using rivets or by means of adhesive bonding. The production method according to the invention makes it possible to secure, in particular, pre-coated pipe holders on boom-arm bodies, which are likewise pre-coated.

A concrete-distributing boom produced using the method according to the invention is suitable, in particular, for use in a truck-mounted concrete pump.

BRIEF DESCRIPTION OF THE DRAWING

The invention will be explained in more detail hereinbelow with reference to an exemplary embodiment illustrated schematically in the drawing, in which.

DETAILED DESCRIPTION OF THE PREFERRED EMBODIMENTS

Figure 1:
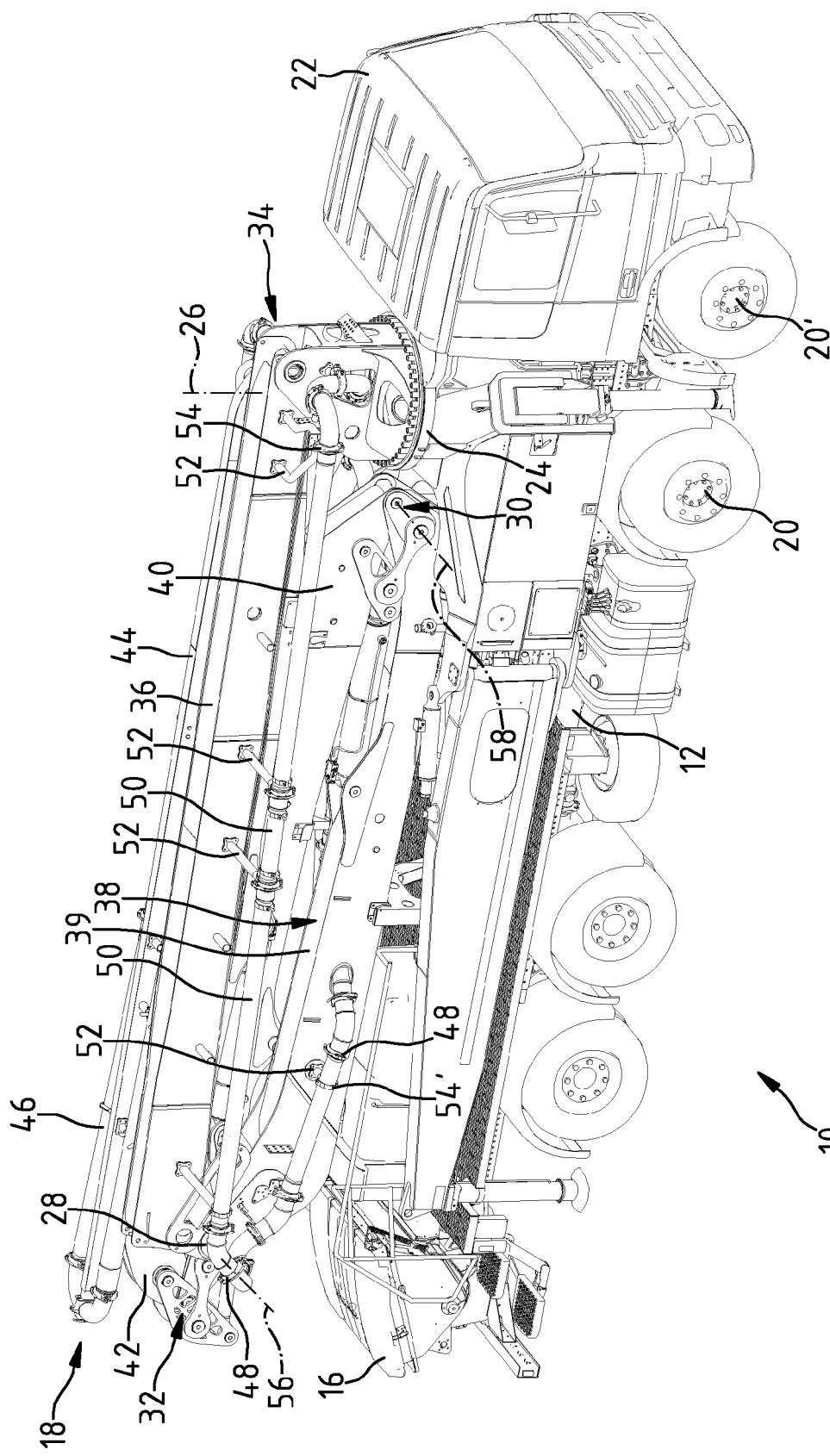
FIG. 1 shows a truck-mounted concrete pump having a concrete-distributing boom.

The truck-mounted concrete pump 10 illustrated in FIG. 1 has a four-axle bogie 12, which bears a two-cylinder thick-matter pump with a material-supply container 16 and a concrete-distributing boom 18. The concrete-distributing boom 18 is mounted on a bearing block 24 such that it can be rotated about a vertical axis 26 in the region of the front axles 20, 20', in the vicinity of the driver's cab 22. The concrete-distributing boom 18 is made up of five boom arms 36, 38, 40, 42, 44, which can be pivoted in relation to one another at the folding articulations 28, 30, 32, 34 by way of axes of articulation, e.g. the axes of articulation 56, 58. The concrete-distributing boom 18 contains a concrete-delivery line 46, which has a plurality of pipe segments 50 connected by pipe couplings 48. The concrete-delivery line 46 is fastened on the bodies of the boom arms 36, 38, 40, 42, 44, e.g. on boom-arm bodies 39, by pipe holders 52. The pipe holders 52 bear the concrete-delivery line 46 at a retaining location 60 by way of a pipe-carrier portion 54, 54', which encloses a pipe segment 50 of the delivery line. In the concrete-distributing boom 18, such a pipe-carrier portion 54, 54' may be configured, in particular, in the form of a coupling piece 62 or in the form of a pipe clamp.

Figure 2:
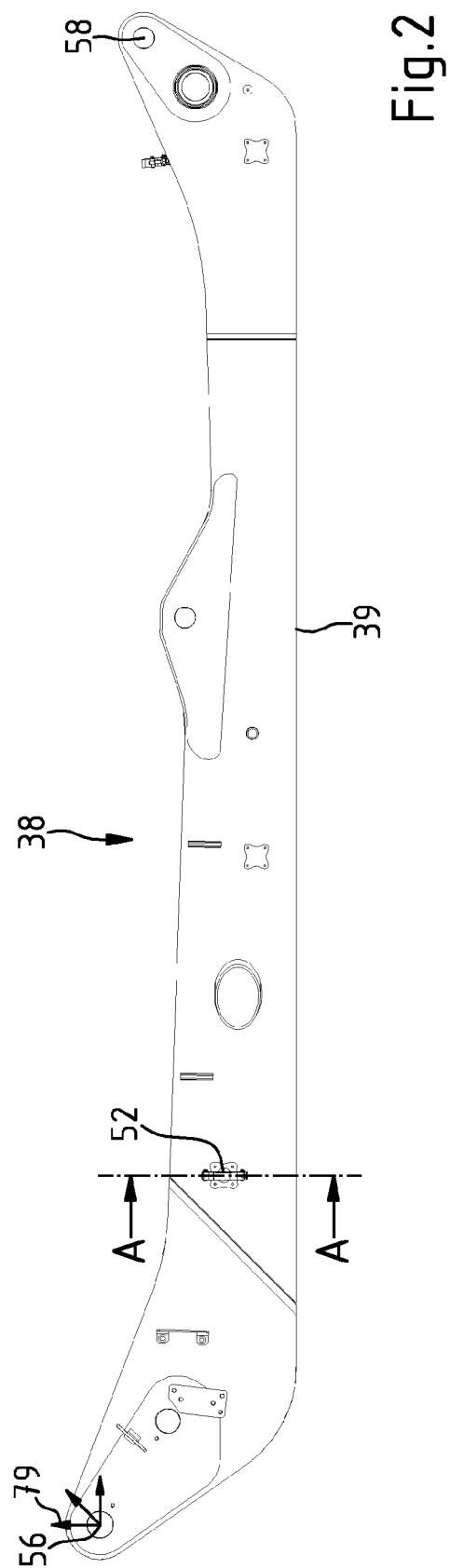
FIG. 2 shows a boom arm of the concrete-distributing boom, having a pipe holder.
Figure 3:
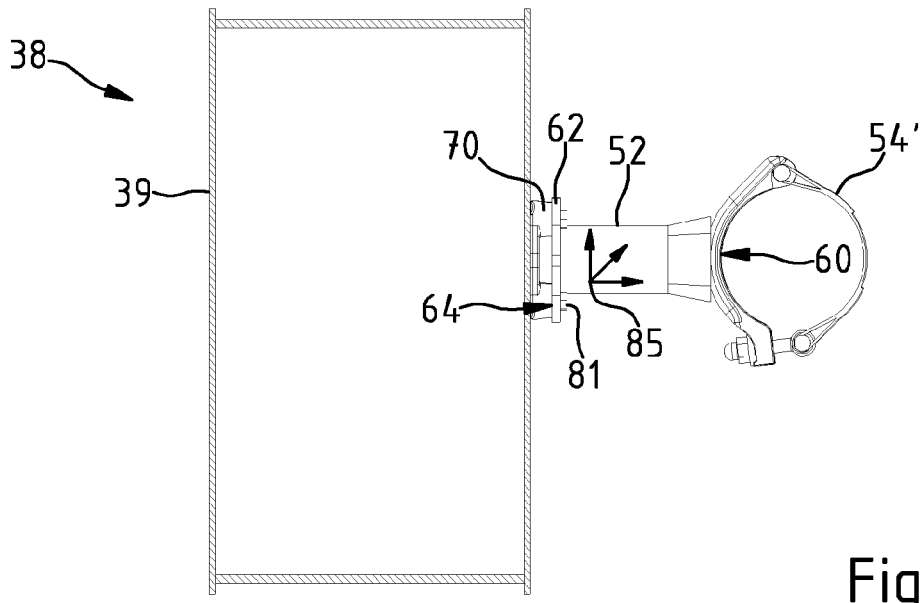
FIG. 3 and FIG. 4 show a section through the boom arm taken along line A-A from FIG. 2, with a pipe holder in the connected state and in the released state, respectively.

FIGS. 2 and 3 show the boom arm 38 in the concrete-distributing boom 18 with a pipe-carrier portion 54' and the retaining location 60 for the concrete-delivery line 46. The boom arm 38 has a hollow-profile body 39 constructed from steel sheets. The pipe holder 52 has a connection interface 64 in a fastening portion 62. The pipe holder 52 is connected, by way of the connection interface 64, to an accommodating interface 68, which is formed on the boom arm 38. The pipe holder 52 is secured on the connection interface 64 by means of fastening screws 81 in bores 83.

Figure 4:
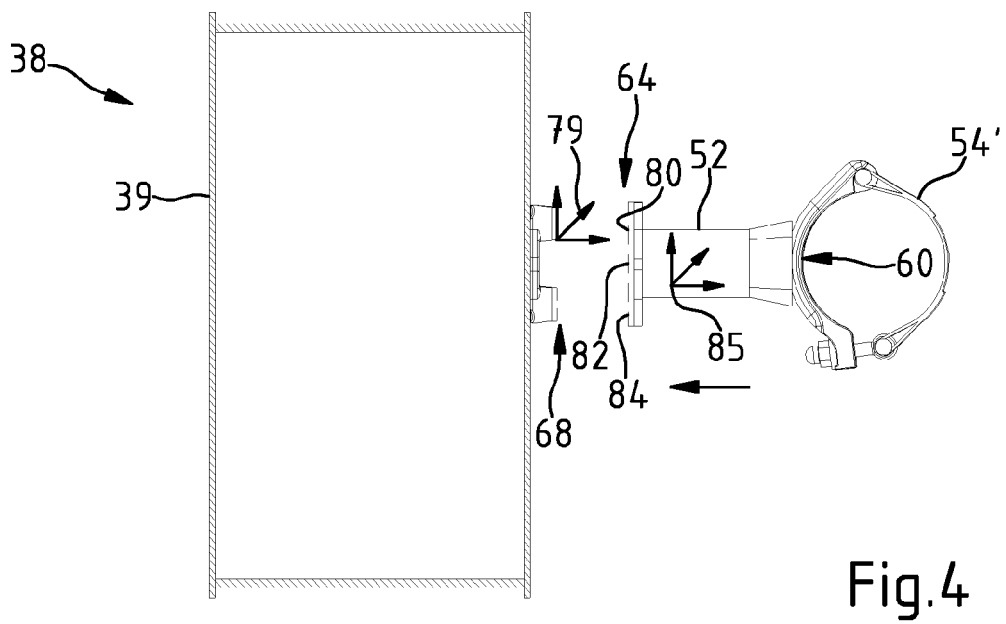

FIG. 4 shows the pipe holder 52 during the operation of connecting the same to the boom-arm body 39. The connection interface 64 of the pipe holder 52 has three positional reference points 80, 82, 84, which define a plane and thus establish a Cartesian co-ordinate system 85 which is fixed in relation to the pipe holder 52. The position of the retaining location 60 of the pipe holder 52 is predetermined by the position of the positional reference points 80, 82, 84 of the connection interface 64. The accommodating interface 68 is located on a plate-like adapter piece 70, which is welded to the hollow-profile body 39 of the boom arm 38.

Figure 5:
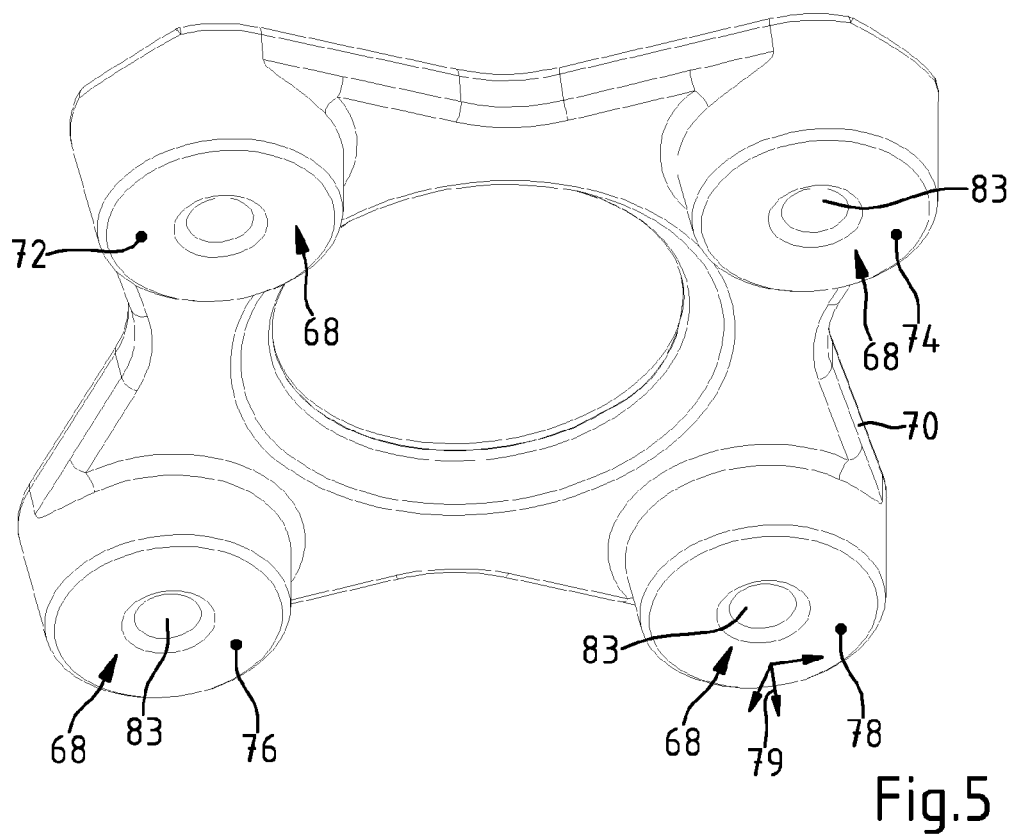
FIG. 5 shows an adapter piece with an accommodating interface for the pipe holder.

FIG. 5 shows the adapter piece 70 with the accommodating interface 68 and bores 82. The accommodating interface 68 has four positional reference points 72, 74, 76, 78, each located on an elevation of the adapter piece. It is also the case that the positional reference points 72, 74, 76, 78 define a plane and establish a Cartesian co-ordinate system 79, which clearly provides the position of the axes of articulation 56, 58. The position of the positional reference points 72, 74, 76, 78 in the boom-arm body 39 is independent of the production tolerances of the latter and is predetermined solely by the position of the axes of articulation 56, 58.

Once the adapter piece 70 has been secured at a machining center, the accommodating interface 68 with the bores 83 on the boom-arm body 39 is produced by machining such that the siting of the positional reference points 74, 76, 78 in relation to the axes of articulation 56, 58 corresponds to a predetermined value. The pipe holder 52, during production, is prefabricated at a machining center such that the retaining location 60 for the concrete-delivery line 46, upon connection of the pipe holder 52 to the accommodating interface 68 of the boom arm, corresponds to a junction point which is arranged on a line which ideally defines the concrete-delivery line 46. This measure makes it possible to compensate for production tolerances of the boom arm 38 without individual adaptation of a pipe holder to the concrete-distributing boom being necessary.

In order to compensate for production tolerances, the fastening portion 62 of the pipe holder 52 and the adapter piece 70 are formed with a material reserve. This material reserve ensures that the system made up of pipe holder 52 and boom arm 38, despite the material weakening associated with follow-up machining, satisfies the strength properties required.

It should be noted that the pipe holder 52 can be secured on the boom arm 38 not just by means of screws, but also using bolts, using rivets or by adhesive bonding. In principle any distortion-free joining method is suitable for securing a pipe holder on a boom arm. If the connection between the pipe holder 52 and boom arm 38 is configured in the form of a releasable connection, it is possible for corresponding pipe holders 52 to be explained straightforwardly within the context of maintenance work.

To summarize, reference should be made, in particular, to the following features: the invention relates to a method for producing a boom arm 38 having a boom-arm body 39 and having at least one pipe holder 52 for a concrete-distributing boom 18 for use on stationary and mobile concrete pumps 10 having a plurality of boom arms 36, 38, 40, 42, 44 which are connected to one another such that they can be pivoted about an axis of articulation 56, 58 at folding articulations 28, 30, 32, 34 and retain a concrete-delivery line 46, which has at least one rotary articulation having an axis of rotation aligned with an axis of articulation 56, 58 of a folding articulation 28, 30. The at least one pipe holder 52 here has a pipe-carrier portion 54, 54', which serves for accommodating the concrete-delivery line 46 at a retaining location 60, of which the siting is predetermined by the position of the axis of articulation 56, 58. The boom-arm body 39 is prefabricated with an accommodating interface 68 and the at least one pipe holder 52 is prefabricated with a fastening portion 62, which has a connection interface 64. The accommodating interface 68 is produced with at least three plane-defining positional reference points 72, 73, 76, 78, which are independent of production tolerances of the boom-arm body 39 and are predetermined by the position of the axis of articulation 56, 58 such that, and the connection interface 64 is designed with at least three plane-defining positional reference points 80, 82, 84, which predetermine the position of the pipe-carrier portion 54, 54' such that, the concrete-delivery line 46, by virtue of the pipe holder 52 having its connection interface 62 connected to the accommodating interface 68 of the boom-arm body 39, can be accommodated by the pipe-carrier portion 54, 54' such that the retaining location 60 has its siting predetermined by the position of the axis of articulation 56, 58.

LIST OF DESIGNATIONS

10 Truck-mounted concrete pump
12 Bogie
16 Material-supply container
18 Concrete-distributing boom
20,20' Front axle
22 Driver's cab
24 Bearing block
26 Axis
28,30,32,34 Folding articulations
36,38,40,42,44 Boom arm
39 Boom-arm body
46 Concrete-delivery line
48 Pipe coupling
50 Pipe segment
52 Pipe holder
54,54' Pipe-carrier portion
56,58 Axes of articulation
60 Retaining location
62 Fastening portion
64 Connection interface
68 Accommodating interface
70 Adapter piece
72,74,76,78 Positional reference points
79,85 Cartesian co-ordinate system
80,82,84 Positional reference points
81 Fastening screw
82 Bore

The invention claimed is:

1. A method for producing a boom arm having a boom-arm body and having at least one pipe holder for a concrete-distributing boom for use on stationary and mobile concrete pumps having a plurality of boom arms which are connected to one another such that they can be pivoted about an axis of articulation at folding articulations and retain a concrete-delivery line, which has at least one rotary articulation having an axis of rotation aligned with an of articulation of folding articulation, wherein the at least one pipe holder has a pipe-carrier portion, which serves for accommodating the concrete-delivery line at a retaining location, of which a siting is predetermined by a position of the axis of articulation, wherein
the boom-arm body is prefabricated with an accommodating interface and the at least one pipe holder is prefabricated with a fastening portion, which has a connection interface, wherein the accommodating interface is produced with at least three plane-defining positional reference points, which are independent of production tolerances of the boom-arm body and are predetermined by the position of the axis of articulation such that, and the connection interface having at least three plane-defining Positional reference points, which predetermine a position of the pipe-carrier portion such that, the concrete-delivery line, by virtue of the pipe holder having a connection interface connected to the accommodating interface of the boom-arm body, is accommodated by the pipe-carrier portion such that the retaining location has a siting predetermined by the position of the axis of articulation.

2. The method as claimed in claim 1, wherein the boom-arm body comprises, at least in part, a hollow-profile body which has a portion with a reinforced reserve, and the accommodating interface is formed in the reinforced wall of the boom art.

3. The method as claimed in claim 1, wherein the connection interface is formed on a connection portion of an adapter piece, which is secured on the boom arm body.

4. The method as claimed in claim 3, wherein the connection interface is formed on an elevation of the adapter piece.

5. The method as claimed in claim 3, wherein the adapter piece is formed with a material reserve in order to compensate for production tolerances.

6. The method as claimed in claim 1, wherein the fastening portion of the pipe holder is a connection piece.

7. The method as claimed in claim 6, wherein the connection piece is formed with a material reserve in order to compensate for production tolerances.

8. The method as claimed in claim 1, wherein the boom-arm body has a plurality of accommodating interfaces for a connection of a pipe holder, each of these accommodating interfaces having at least three plane-defining positional reference points, which are independent of production tolerances of the boom-arm body and are predetermined by the position of the axis of articulation.

9. The method as claimed in claim 1, wherein the accommodating interface is produced in a machining center for machining workpieces with dimensioning related to the position of the axes of articulation.

10. The method as claimed in claim 1, wherein the connection interface is produced in a machining center for machining workpieces with dimensioning related to the position of the concrete-delivery line accommodated by the pipe holder.

11. The method as claimed in claim 1, wherein the pipe holder is fastened on the boom-arm body using a releasable fastening means.

12. The method as claimed in claim 1, wherein the pipe holder is fastened on the boom-arm body using a distortion-free joining method.

13. A concrete-distributing boom for use on stationary and mobile concrete pumps having a plurality of boom arms which are connected to one another such that they can be pivoted about an axis of articulation at folding articulations and retain a concrete-delivery line, which has at least one rotary articulation having an axis of rotation aligned with an axis of articulation of a folding articulation having at least one boom arm which has a boom-arm body and at least one pipe holder, wherein the at least one pipe holder has a pipe-carrier portion which serves for accommodating the concrete-delivery line at a retaining location, of which a siting predetermined by a position of the axis of articulation, wherein
the boom-arm body has an accommodating interface and the at least one pipe holder has a fastening portion which has a connection interface, wherein the accommodating interface has at least three plane-defining positional reference points, which are independent of production tolerances of the boom-arm body and are predetermined by the position of the axis of articulation such that, and the connection interface has at least three plane-defining positional reference points, which predetermine a position of the pipe-carrier portion such that, the concrete-delivery line, by virtue of the pipe holder having its connection interface connected to the accommodating interface of the boom-arm body, can be accommodated by the pipe-carrier portion such that the retaining location has a siting predetermined by the position of the axis of articulation.

14. A truck-mounted concrete pump having a concrete-distributing boom as claimed in claim 13.

* * * * *